US007299207B1

(12) United States Patent
Gologorsky et al.

(10) Patent No.: US 7,299,207 B1
(45) Date of Patent: Nov. 20, 2007

(54) DATA PROCESSING SYSTEM THAT PROVIDES AN AUCTION WITH PROGRAMMABLE PROXY BIDS

(75) Inventors: Steven Phillip Gologorsky, Montville, NJ (US); Brian David Parlato, Hillsborough, NJ (US)

(73) Assignee: DeMont & Breyer, LLC, Holmdel, NJ (US)

( * ) Notice: Subject to any disclaimer, the term of this patent is extended or adjusted under 35 U.S.C. 154(b) by 1391 days.

(21) Appl. No.: 09/938,141

(22) Filed: Aug. 23, 2001

Related U.S. Application Data

(60) Provisional application No. 60/227,188, filed on Aug. 23, 2000.

(51) Int. Cl.
*G06Q 40/00* (2006.01)
(52) U.S. Cl. .......................................... 705/37; 705/35
(58) Field of Classification Search ................ 705/37, 705/35
See application file for complete search history.

(56) References Cited

U.S. PATENT DOCUMENTS 6,055,518 A * 4/2000 Franklin et al. .............. 705/37
6,199,050 B1 * 3/2001 Alaia et al. ................... 705/37
6,243,691 B1   6/2001 Fisher et al.
6,871,191 B1 * 3/2005 Kinney et al. ................ 705/37
2002/0013760 A1   1/2002 Arora et al.

OTHER PUBLICATIONS

Miller, Michael. The Complete Idiot's Guide to Online Auctions. Que, 1999. pp. 157-160.*

* cited by examiner

*Primary Examiner*—James A. Kramer
*Assistant Examiner*—Jennifer Liversedge

(57) ABSTRACT

In the context of computer-based auctions, innovations in proxy bids and auction formats are disclosed. In accordance with the illustrative embodiment, a bidder can program a data processing system to enter one or more bids by proxy. The capabilities offered by the data processing system include: determining one or more bid variables based, at least in part, on the identity of one or more bidders in an auction, or determining one or more bid variables based, at least in part, on the absence of one or more bidders from an auction, or determining one or more bid variables based, at least in part, on the bid variables in one or more other bids, or determining one or more bid variables based, at least in part, on the results of another auction, or determining one or more bid variables based, at least in part, on default values, or waiting a specific or random amount of time before entering a bid in behalf of a bidder, or any combination of these.

16 Claims, 5 Drawing Sheets

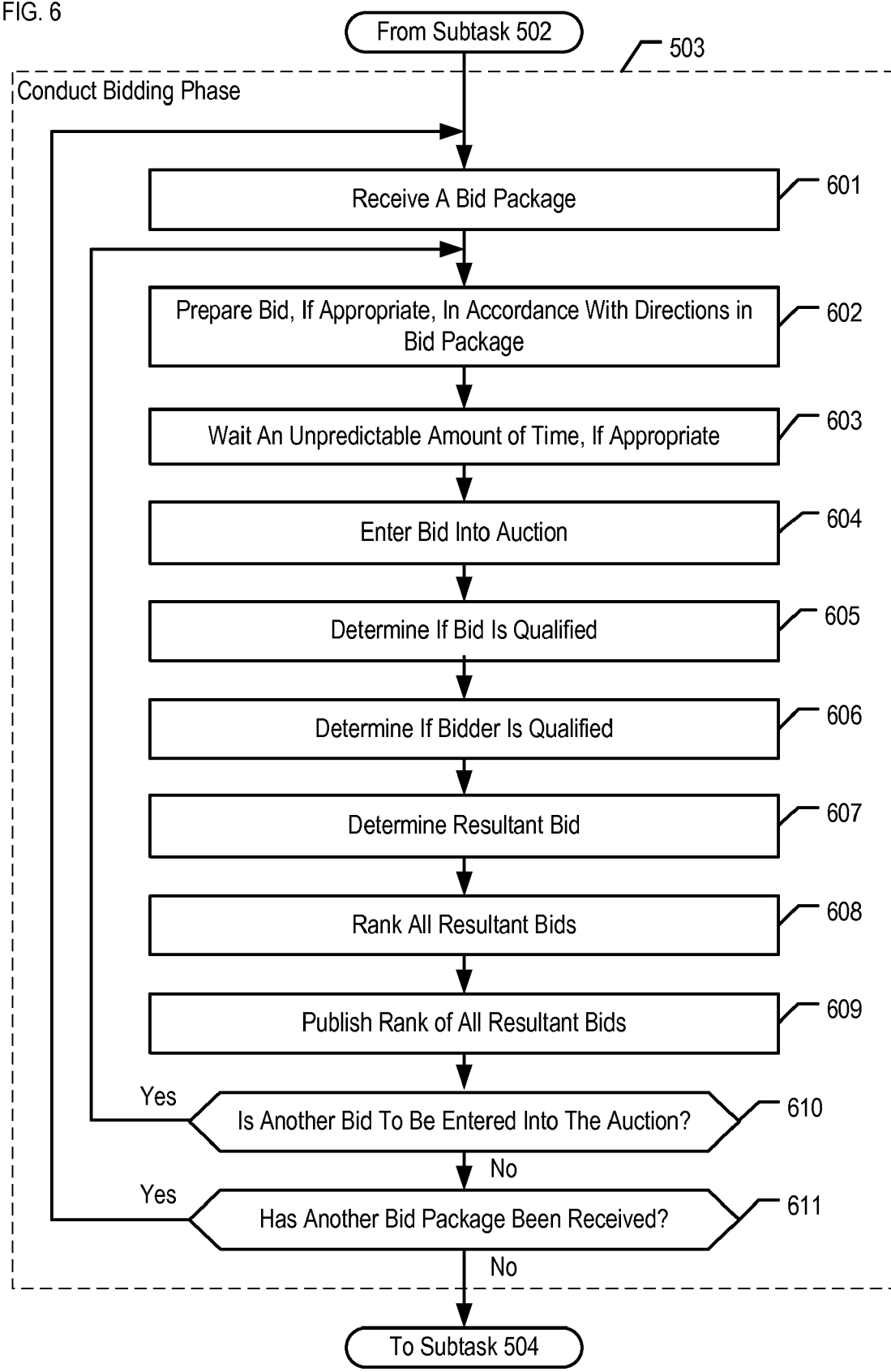

DATA PROCESSING SYSTEM THAT PROVIDES AN AUCTION WITH PROGRAMMABLE PROXY BIDS

REFERENCE TO RELATED APPLICATIONS

This application claims the benefit of U.S. provisional application Ser. No. 60/227,188, filed Aug. 23, 2000 and entitled "Intelligent Bids," which is also incorporated by reference.

The following patent applications are incorporated by reference:
1. U.S. provisional application Ser. No. 60/227,187, filed Aug. 23, 2000, entitled "Multi-Variable Visual Computerized Auction,";
2. U.S. patent application Ser. No. 09/896,715, filed on Jun. 30, 2001 and entitled "Formula-Based Computerized Auction";
3. U.S. patent application Ser. No. 09/895,483, filed on Jun. 30, 2001 and entitled "Multi-Variable Computer Based Auction";
4. U.S. patent application Ser. No. 09/896,618, filed on Jun. 30, 2001 and entitled "Bid Value-Base Public Opening Time Bid";
5. U.S. patent application Ser. No. 09/896,619, filed on Jun. 30, 2001 and entitled "System And Method For Computerized Auctions Having One Or More Rounds Of Bidding";
6. U.S. application Ser. No. 09/935,866, filed Aug. 23, 2001, entitled "Subcontract Bid Assistant,"; and
7. U.S. application Ser. No. 09/935,812, filed Aug. 23, 2001, entitled "Construction Quote System,".

FIELD OF THE INVENTION

The present invention relates to electronic commerce in general, and, more particularly, to a data processing system for providing formula-based computerized auctions.

BACKGROUND OF THE INVENTION

Currently, there are many computer-based auction systems (e.g., eBay, CommerceOne, SupplierMarket, SupplierOne, MaterialNet, etc.) in which bidders bid against each other in one or more rounds of bidding until the most advantageous bid is reached for a scope as defined by the auction solicitor. These auctions have worked well and have been quite successful in driving prices down in reverse auctions and prices up in forward auctions.

The current interest in computer-based auctions has prompted innovations in the format of auctions. For example, in the prior art, the bidding phase of an auction often lasted for only a few minutes, which is short enough to continuously hold the attention of all of those interested in the outcome of the auction. In contrast, auctions today, like those on eBay for example, typically last for days. Although a longer auction has many advantages, it is too long for any single bidder to continuously monitor the bidding. To alleviate this disadvantage, eBay, for example, enables a bidder to submit a "proxy bid." A proxy bid is a direction to the auctioneer (e.g., eBay's data processing system, etc.) or other entity to prepare and enter one or more bids in behalf of the bidder under terms and conditions specified by the bidder.

The proxy bid capabilities known in the prior art, however, have their limitations, and, therefore, the need exists for more advantageous kinds of proxy bids and auction formats.

SUMMARY OF THE INVENTION

The present invention provides innovations in proxy bidding and auction formats that avoid some of the costs and disadvantages of proxy bids and auction formats in the prior art. In particular, proxy bids in accordance with the illustrative embodiment offer more functionality and more flexibility than proxy bids in the prior art.

In accordance with the illustrative embodiment, a bidder can program a data processing system to enter one or more bids by proxy. To this end, the capabilities offered by the data processing system include, but are not limited to:
 i. determining one or more bid variables based, at least in part, on the identity of one or more bidders in an auction, or
 ii. determining one or more bid variables based, at least in part, on the absence of one or more bidders from an auction, or
 iii. determining one or more bid variables based, at least in part, on the bid variables in one or more other bids, or
 iv. determining one or more bid variables based, at least in part, on the results of another auction, or
 v. determining one or more bid variables based, at least in part, on default values, or
 vi. determining one or more bid variables based, at least in part, on the current time, or,
 vii. determining one or more bid variables based, at least in part, on an external condition or value, or
 viii. determining one or more bid variables based, at least in part, on a random (i.e., stochastic) function, or
 ix. any combination of i, ii, iii, iv, v, vi, vii, and viii.

Furthermore, the illustrative embodiment enables the partitioning of the scope of an auction into a plurality of portions such that a bidder can bid on:
 i. one or more portions of the scope, or
 ii. the entire scope, or
 iii. both i and ii.

When the scope of an auction is partitioned, the winner(s) of the auction is determined in three steps. In the first step, a candidate winning bid for the entire scope is determined. In the second step, the candidate winning bids for each portion of the scope is determined. In the third step, the winner of the auction is determined by deciding which of:
 i. the candidate winning bid for the entire scope, or
 ii. the sum of the candidate winning bids for each portion of the scope in each way that the scope is partitioned (provided that there is a candidate winning bid for each portion of the scope in the way that the scope is partitioned)

is more advantageous to the auction solicitor. Typically, an auction solicitor will do better when it enables the scope of an auction to be partitioned, and will do better still when it partitions the scope in more, rather than fewer ways.

The illustrative embodiment comprises: entering, at a data processing system, a first bid into the auction from a first bidder; receiving, at the data processing system, a bid package from a second bidder, wherein the bid package directs the data processing system to determine a bid variable based, at least in part, on the identity of the first bidder; and entering, at the data processing system, a second bid into the auction from the second bidder, wherein the second bid comprises the bid variable as determined by the data processing system.

BRIEF DESCRIPTION OF THE DRAWINGS

FIG. 6 depicts a flowchart of the subtasks that compose subtask 503, as depicted in FIG. 5.

DETAILED DESCRIPTION

Figure 1:
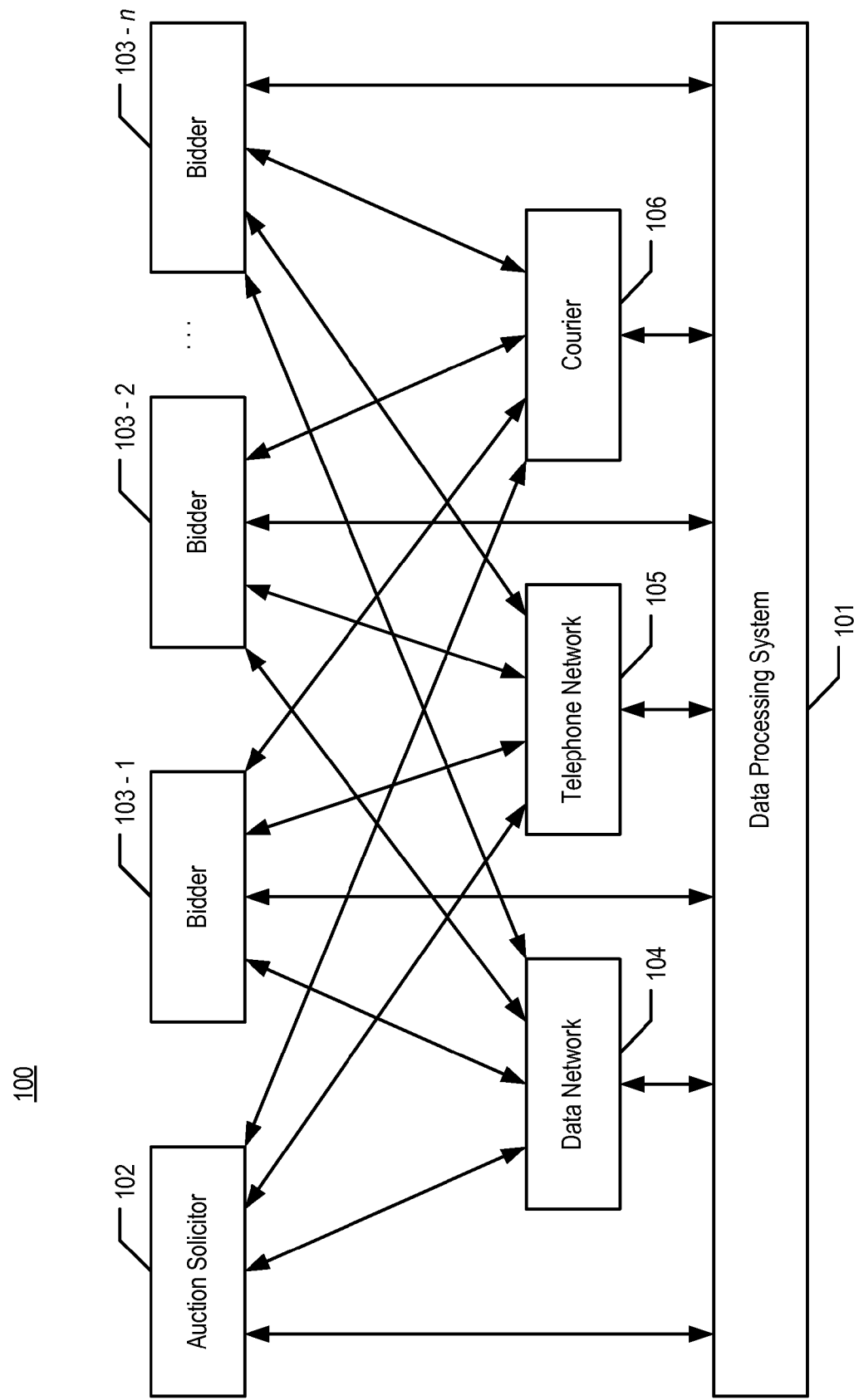
FIG. 1 depicts a schematic diagram of the illustrative embodiment of the present invention.

FIG. 1 depicts a schematic diagram of the illustrative embodiment of the present invention 100 in which data processing system 101 conducts an auction (i.e., is the auctioneer of an auction) in behalf of auction solicitor 102 and between bidders 103-1 through 103-$n$, wherein n is a positive integer greater than zero. In accordance with the illustrative embodiment, data processing system 101 is owned and operated by one or more entities that are independent of auction solicitor 102 and bidders 103-1 through 103-$n$. In some alternative embodiments of the present invention, however, data processing system 101 is:

i. owned, or
  ii. operated, or
  iii. owned and operated, by
  i. auction solicitor 102, or
  ii. one or more of bidders 103-1 through 103-$n$, or
  iii. both auction solicitor 102 and one or more of bidders 103-1 through 103-$n$.

In accordance with the illustrative embodiment, the owner or the operator or the owner and the operator of data processing system 101 receives a fee in consideration for conducting an auction in behalf of auction solicitor 102. In some embodiments of the present invention, the fee is paid by auction solicitor 102. In some alternative embodiments of the present invention, the fee is paid by one or more of bidders 103-1 through 103-$n$.

In accordance with the illustrative embodiment, auction solicitor 102 and bidders 103-1 through 103-$n$ are capable of providing data to and receiving data from data processing system 101 via:

1. data network 104 (e.g., the Internet, a private data network, a local area network, a wireless data network, etc.), or
  2. telephone network 105 (e.g., the Public Switched Telephone Network, a wireless telephony network, etc.), or
  3. courier 106 (e.g., Federal Express, the U.S. Mail, publication in a newspaper, publication in a periodical, etc.), or
  4. in person by being co-located with local input/output device 202 (shown in FIG. 2) of data processing system 101, or
  5. any combination of i, ii, iii, and iv.

It will be clear to those skilled in the art how to make and use embodiments of the present invention in which auction solicitor 102 and bidders 103-1 through 103-$n$ communicate with data processing system 101 in person, through data network 104, telephone network 105, and/or courier 106.

Figure 2:
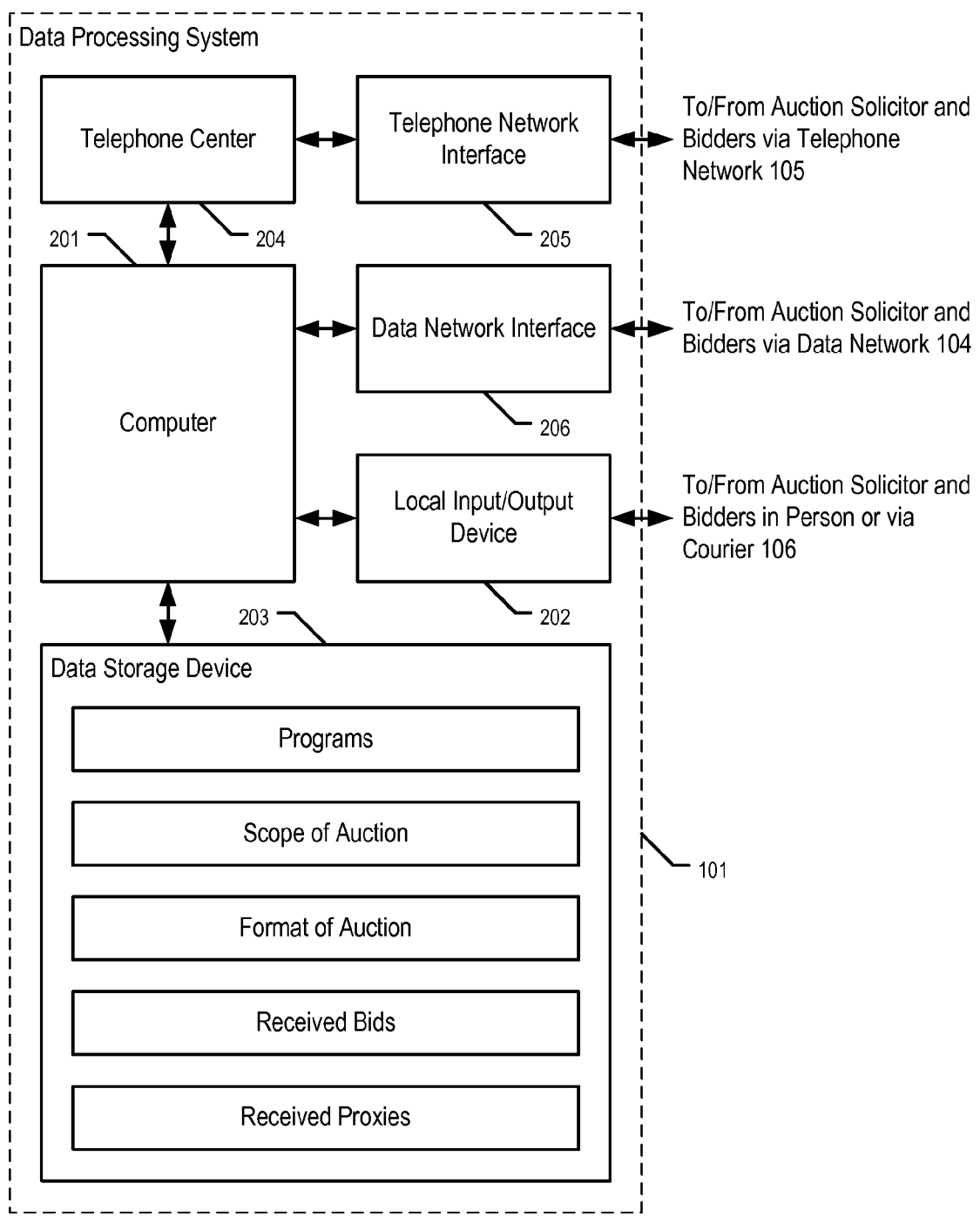
FIG. 2 depicts a block diagram of a data processing system in accordance with the illustrative embodiment of the present invention.

FIG. 2 depicts a block diagram of the salient components of data processing system 101, which comprises computer 201, local input/output device 202, data storage device 203, telephone center 204, telephone network interface 205, and data network interface 206.

Computer 201 is a general-purpose processor that is capable of performing the functionality described below and with respect to FIGS. 3 through 5. For example, computer 201 is capable of:

executing one or more programs that are stored in data storage device 203;

storing the scope of an auction into data storage device 203, retrieving it from data storage device 203, and conducting an auction that is consistent with that scope;

storing the format of an auction in data storage device 203, retrieving it from data storage device 203, and conducting an auction that is consistent with that format;

storing the bids received for an auction in data storage device 203, retrieving them from data storage device 203, and evaluating their relative advantageousness to the auction solicitor;

storing the proxy bids for an auction in data storage device 203, retrieving them from data storage device 203, and executing them;

receiving data from and outputting data to local input/output device 202;

receiving data from and outputting data to telephone center 204; and receiving data from and outputting data to data network interface 206.

Local input/output device 202 comprises one or more machines (e.g., terminals, scanners, printers, disk drives, displays, etc.) into which data from auction solicitor 102 and bidders 103-1 through 103-$n$ can be received and from which data from data processing system 101 can be output to auction solicitor 102 and bidders 103-1 through 103-$n$.

Data storage device 203 is a non-volatile memory (e.g., a hard disk, flash memory, a tape drive, an optical device, etc.) for storing, for example, the programs executed by computer 201 and the data input into computer 201 and generated by computer 201.

Data network interface 206 enables auction solicitor 102 and bidders 103-1 through 103-$n$ to communicate with data processing system 101 via a data network, such as the Internet. For example, data processing system 101 can receive data and can output data via Web pages.

Auction solicitor 102 and bidders 103-1 through 103-$n$ can communicate with data processing system 101 via telephone, such as through a toll-free "800" number. To this end, telephone network interface 205 advantageously comprises one or more telephones that are capable of receiving calls from and placing calls to auction solicitor 102 and bidders 103-1 through 103-$n$. Telephone network interface 205 can further comprise an automatic call distribution system, in well-known fashion, for routing incoming calls to the various telephones. Furthermore, telephone network interface 205 is advantageously capable of receiving information from auction solicitor 102 and bidders 103-1 through 103-$n$ via a touch-tone interface wherein the parties input information to the system by pushing the buttons on their telephones in response to questions from an automated operator.

Telephone center 204 advantageously comprises one or more computer terminals that are operated by the personnel associated with telephone network interface 205 such that an operator (either human or automated) can shuttle data between computer 201 and a bidder and auction solicitor 102, who is in contact with data processing system 101 via telephone network interface 205.

It will be clear to those skilled in the art how to make and use computer 201, local input/output device 202, data storage device 203, telephone center 204, telephone network interface 205, and data network interface 206.

Although data processing system 101 is depicted as only comprising one computer, one local input/output device, one data storage device, one telephone center, one telephone network interface, and one data network interface, it will be clear to those skilled in the art that a data processing system in accordance with the present invention can comprise:

i. one or more computers, or
  ii. one or more local input/output devices, or
  iii. one or more data storage devices, or
  iv. one or more telephone centers, or
  v. one or more telephone network interface, or
  vi. one or more data network interfaces, or
  vii. any combination of i, ii, iii, iv, v, vi, and vii.

whether any combination of computers, local input/output devices, data storage devices, telephone centers, telephone network interfaces, and data network interfaces are networked (e.g., a wide area network, a local area network, etc.) or not networked (e.g., a sneakernet, etc.), that cooperate to perform the functionality described below and with respect to FIGS. 3 through 5. Furthermore, it will be clear to those skilled in the art that the various components of data processing system 101 need not be co-located, but can separated by hundreds or thousands of miles, which various components can be networked (e.g., a wide area network, etc.) or not networked (e.g., a sneakernet, etc.).

Figure 3:
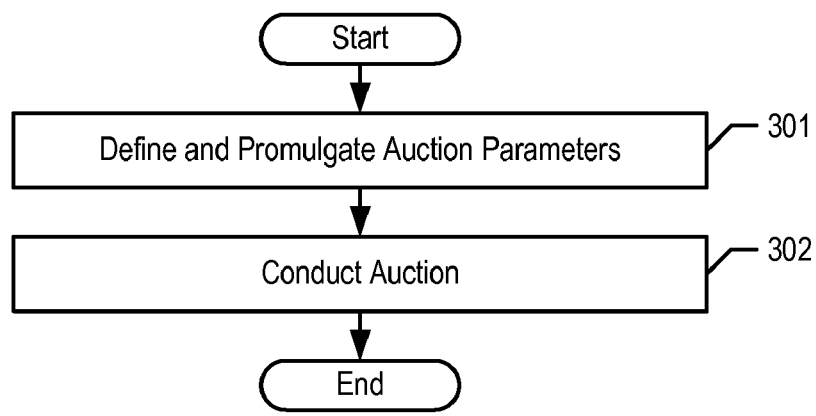
FIG. 3 depicts a flowchart of the operation of the illustrative embodiment of the present invention.

FIG. 3 depicts a flowchart of the operation of the illustrative embodiment. For pedagogical purposes, the illustrative embodiment will be described in general and then it will be described in conjunction with an illustrative example. In accordance with this specification, the operation of the illustrative embodiment is described in terms of tasks and subtasks rather than steps because, as will be clear to those skilled in the art, some of the described tasks and subtasks can be performed in a single step. Furthermore, the illustrative embodiment is more easily understood when it is described in terms of its constituent tasks and subtasks than if it were described, formalistically, in terms of "steps."

At task 301, the parameters of an auction are defined and promulgated. Although the auction solicitor typically initiates the need for the auction, and, therefore, the definition of the auction parameters, the auction solicitor might be assisted by consultants in the task of defining the auction parameters. In some alternative embodiments of the present invention, the operator of data processing system 101 can define some or all of the auction parameters. Task 301 is described in detail below and with respect to FIG. 4.

At task 302, the auction is conducted in accordance with the parameters that were defined and promulgated in task 301. In accordance with the illustrative embodiment, this includes, but is not limited to, the initiation of the auction, the receipt of bid packages, the execution of proxy bids, the entering of bids into the auction, and the determination of the winning bid or bids. Task 302 is described in detail below and with respect to FIGS. 5 through 7.

Figure 4:
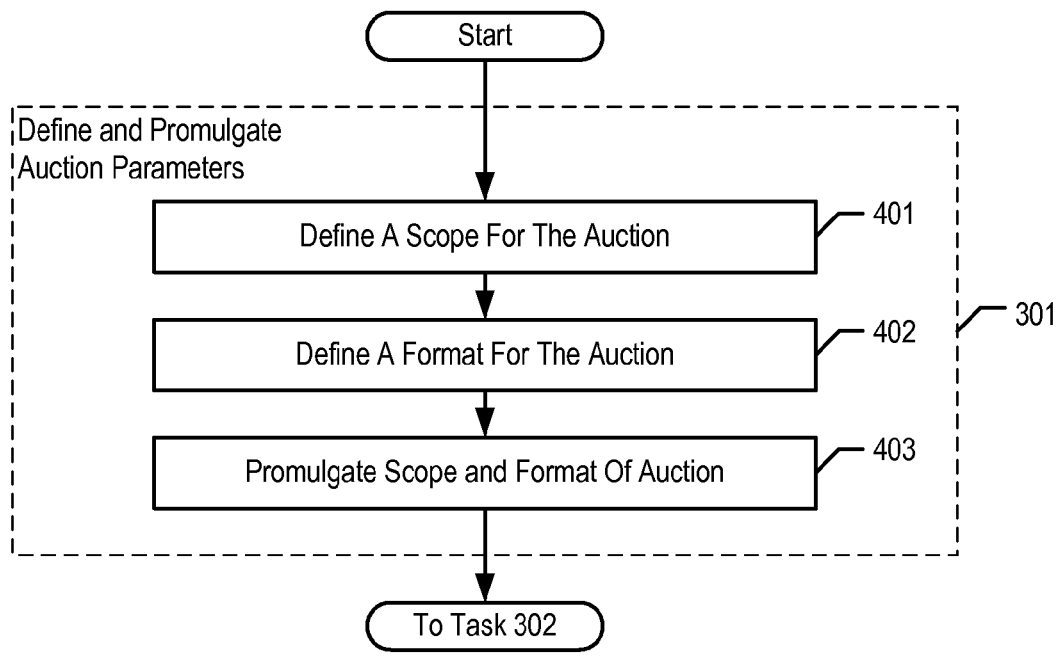
FIG. 4 depicts a flowchart of the tasks associated with defining an auction as depicted in FIG. 3.

FIG. 4 depicts a flowchart of the subtasks that compose task 301.

At subtask 401, a scope for the auction is defined. For the purposes of this specification, the "scope" of an auction is defined as what the auction solicitor seeks to provide (e.g., information, money, services, goods, reality, intangible property, intellectual property, etc.) in consideration for what the auction solicitor seeks to acquire (e.g., information, money, services, goods, reality, intangible property, intellectual property, etc.) as a result of the auction.

For example, when an auction solicitor is a cinder block manufacturer who seeks to sell one lot of 5,000 cinder blocks to one of several masons, the scope of the auction might be to provide 5,000 cinder blocks in consideration for an amount of money to be determined as part of the auction. As another example, when the auction solicitor is a taxi and limousine company that seeks a 1-year service contract for its fleet, the scope of the auction might reasonably be to acquire 48 oil changes for the vehicles in its fleet in a 12-month interval in consideration for a number of taxi rides to be determined as part of the auction and an amount of money to be determined as part of the auction.

The scope of the auction advantageously, but not necessarily, defines the mandatory and non-discretionary aspects of a qualified bid, when any have been indicated by auction solicitor 102 or data processing system 101. In other words, a bid that does not satisfy all of the mandatory and non-discretionary requirements that are indicated is void or voidable at the auction solicitor's election. For example, for the taxi and limousine company that seeks the oil changes for its fleet, the mandatory and non-discretionary aspects of the scope of the auction might be that the winning bidder must supply at least five quarts of 10W-40 Mobil® One® oil and one Framm® oil filter in each of the 48 specified oil changes.

The scope of the auction advantageously, but not necessarily, defines the optional or discretionary aspects of a qualified bid. The optional or discretionary aspects of a qualified bid are not essential elements that a bid must possess in order to be a qualified bid, but are variable factors that affect how the various bids are ranked and the winning bid(s) is/are determined. For example, for the taxi and limousine company that seeks the oil changes for its fleet, there are two optional and discretionary aspects of a qualified bid: (1) the number of taxi rides to be provided by the taxi and limousine company to the winning bidder, and (2) the amount of money to be provided by the taxi and limousine company to the winning bidder. In other words, because the taxi and limousine company seeks to pay for the oil changes with a combination of money and services, each bid will comprise:

1. an indicium of the number of taxi rides, and
  2. an indicium of the amount of money that in combination the bidder is willing to accept in consideration for the oil changes. For example, this enables a first bidder to indicate that it is willing to accept 100 taxi rides and no money in exchange for the oil changes, a second bidder to indicate that it is willing to accept 25 taxi rides and $400 in exchange for the oil changes, and a third bidder to indicate that it is willing to accept no taxi rides and $825 in exchange for the oil changes.

The mandatory and non-discretionary aspects of a bid and the optional or discretionary aspects of a bid can involve the same aspect. For example, when an auction solicitor desires to buy a truck, the scope of an auction might specify that a mandatory and non-discretionary aspect of the bid is a two-year warranty and an optional or discretionary aspect of the bid is a warranty for more than two years. In other words, one aspect (e.g., the length of a warranty, etc.) can have both a mandatory and non-discretionary aspect of the bid and an optional or discretionary aspect of the bid so long as there is a clear demarcation of the line between the mandatory and non-discretionary aspect and the optional or discretionary aspect.

The scope of the auction advantageously, but not necessarily, defines the mandatory and non-discretionary requirements of a qualified bidder, when any have been indicated by auction solicitor 102 or data processing system 101. In other words, a bid from a bidder who does not satisfy all of the mandatory and non-discretionary requirements that are indicated is void or voidable at the auction solicitor's election. For example, when an auction solicitor is a corporation that seeks to provide dental care for its employees, the mandatory and non-discretionary aspects of the scope of the auction might reasonably be that the bidder, to be a qualified bidder, must hold a current and valid license to practice dentistry.

The scope of the auction advantageously, but not necessarily, defines the optional or discretionary aspects of a qualified bidder. The optional or discretionary aspects of a qualified bid are not essential elements that a bidder must possess in order to be a qualified bidder, but are factors that affect how the bid from the bidder is compared to other bids and how the winning bid(s) determined. Typically, the optional or discretionary aspects of a qualified bidder are framed in terms of a property of the bidder (e.g., how long the bidder has been in business, whether the bidder and the auction solicitor have ever done business before, the bidder's liquidity, etc.). For example, because the taxi and limousine company seeks to enter into a long-term contract, the company might reasonably place a premium in contracting with a bidder who is financially stable and who has been in business for a while. In this case, the scope of the auction might reasonably include as optional or discretionary aspects of the bid: (1) an indicium of the financial stability of the bidder, and (2) an indicium of the length of time that the bidder has been in business.

The mandatory and non-discretionary aspects of a bidder and the optional or discretionary aspects of a bidder can involve the same aspect. For example, when an auction solicitor desires to buy a truck, the scope of an auction might specify that a mandatory and non-discretionary aspect of the bidder is that the bidder has been in business for at least two years and an optional or discretionary aspect of the bidder is how long it has been in business for more than two years.

In other words, one aspect (e.g., the length of time that the bidder has been in business, etc.) can have both a mandatory and non-discretionary aspect of the bidder and an optional or discretionary aspect of the bidder so long as there is a clear demarcation of the line between the mandatory and non-discretionary aspect and the optional or discretionary aspect.

The values of one or more optional or discretionary aspects of a bid or bidder or a bid and a bidder as submitted in a bid can affect the acceptable range of:
  i. an optional or discretionary aspect of a bid, or
  ii. an optional or discretionary aspect of a bidder, or
  iii. a mandatory and nondiscretionary aspect of a bid, or
  iv. a mandatory and nondiscretionary aspect of a bidder, or
  v. and combination of i, ii, iii, and iv.

For example, if as part of a bid, a bidder seeks to carry X dollars of cargo for an auction solicitor, a mandatory and nondiscretionary aspect of the bidder might be that the bidder currently carries at least X dollars in casualty insurance.

In summary, the scope of the auction informs a candidate bidder with a complete and precise definition of:
  i. what the auction solicitor seeks to acquire as a result of the auction,
  ii. what the auction solicitor seeks to provide as a result of the auction,
  iii. the mandatory and non-discretionary requirements of a qualified bid,
  iv. the optional or discretionary aspects of a qualified bid,
  v. the mandatory and non-discretionary requirements of a qualified bidder, and
  vi. the optional or discretionary aspects of a qualified bidder.

In accordance with the illustrative embodiment, each bid comprises one or more optional or discretionary aspects (of the bid or of the bidder or of the bid and bidder) that in combination determine the ordinal ranking of the bid with respect to the other bids. As described below, the illustrative embodiment comprises a mechanism for enabling the objective comparison and ordinal ranking of bids that comprise two or more optional or discretionary aspects of the bid or bidder or bid and bidder.

At subtask 402, the format of the auction is established. For example, the format of an auction advantageously specifies, but is not limited to:
  i. when or under what circumstances the auction begins and ends,
  ii. whether the auction is a sealed-bid auction or not,
  iii. how many units or lots of the scope will be competed for,
  iv. whether the scope is partitioned or not, and if so, how,
  v. whether the auction comprises one or more rounds,
  vi. how bids are made,
  vii. what functionality can be provided by data processing system 101 in preparing a proxy bid,
  viii. how bids are evaluated and compared,
  ix. whether the ranking of bids will be disclosed while new and revised bids are still accepted, and
  x. how the winning bid(s) is determined.

For example, the illustrative embodiment can be used with, for example, one-sided auctions (e.g., the English auction format, the Dutch auction format, the Vickery auction format, the first-price, sealed-bid auction format, and their variants, etc.) and double-sided auctions (e.g., the continuous double auction format, the Double Dutch auction format, the Japanese auction format, and their variants, etc.).

The illustrative embodiment can be used with sealed-bid auctions and non-sealed-bid auctions. For the purposes of this specification, a "sealed-bid" auction is defined as an auction that comprises distinct bidding and resolution phases. In a typical sealed-bid auction, some or all of the contents of each bid submitted during the bidding phase are withheld from the bidders until the resolution phase. A sealed-bid auction can comprise a single round or multiple rounds.

In accordance with the illustrative embodiment, the bids are compared and ranked by plugging in the value of the optional or discretionary aspects associated with each bid into a formula to produce a resultant bid and then by ranking the resultant bids based on their relative magnitude. In accordance with the present specification, each of the optional or discretionary aspects of a bid is called a "bid variable."

In accordance with the illustrative embodiment, data processing system 101 receives T bids in an auction, wherein T is a positive integer greater than zero. In accordance with the illustrative embodiment, each bid, $b_k$, wherein k=1 to T, comprises m bid variables, $v_{1,k}$ through $v_{m,k}$. For the purposes of this specification, a "bid variable" is defined as a discretionary or optional aspect of a bid or bidder. The integrity and public confidence in the auction process is enhanced when the bid variables are defined in such a way that their values can be determined or verified objectively and not subjectively.

A bid variable can be, for example:

a binary bid variable (e.g., the inclusion or absence of a warranty in a bid, whether the bidder has or has not previously supplied similar scope to the auction solicitor in the past, whether the bidder has small disadvantaged business status, etc.); or an integer bid variable (e.g., the number of workers to be assigned to a project, the number of computers to be tendered, etc.); or a continuous bid variable (e.g., the fuel mileage of a dump truck, the length of time that a warranty will run, etc.).

A binary bid variable has two possible values, TRUE or FALSE. An integer bid variable and a continuous bid variable can have no bounds (i.e., range from negative infinite to positive infinite), or can have a single bound (i.e., $v_3>34$), or can have two bounds (i.e., $34<v_3<57$), or more than two bounds (i.e., $34<v_3<57$ or $v_3>135$).

A bid variable can be a dimensioned or dimensionless quantity. Example dimensioned bid variables that relate to physical properties include, but are not limited to:

i. mass (e.g., the mass of a projectile, etc.);

ii. weight (i.e., force) (e.g., the weight of a portable computer, etc.);

iii. length (e.g., the length of an I-beam, the distance of the bidder's premises to the job site, the perimeter of a field, etc.);

iv. area (e.g., the area of a rug, etc.);

v. volume (e.g., the volume of a refrigerator, etc.);

vi. time (e.g., the length of time that a warranty will run, the number of years of experience that the bidder has in some field, when the bidder demands to be paid, etc.);

vii. electrical charge (e.g., the maximum number of coulombs held in a capacitor, etc.);

viii. energy (e.g., the storage capacity of a battery, etc.);

ix. power (e.g., the horsepower of an engine, etc.);

x. pressure (e.g., the average pressure created by a pump, etc.)

xi. velocity (e.g., the maximum speed of an aircraft, etc.);

xii. acceleration (e.g., the effectiveness of a parachute, etc.);

xiii. acidity (e.g., the pH of a dye, etc.);

xiv. a performance metric (e.g., the effectiveness of a drug in obtaining results, etc.); and xv. any combination of i, ii, iii, iv, v, vi, vii, viii, ix, x, xi, xii, xiii, and xiv.

Example dimensioned bid variables that relate to finance include, but are not limited to:

i. money (e.g., the price for a hundred gallons of orange-juice, etc.);

ii. interest (e.g., the rate at which past due invoices will be charged interest, etc.);

iii. liquidity (e.g., the cash-to-asset ratio of the bidder, etc.); and iv. financial stability (e.g., the credit rating of the bidder, etc.);

Example dimensioned bid variables that relate to a property of the bidder itself include, but are not limited to:

i. a satisfaction metric (e.g., how pleased other parties have been with the past performance of the bidder as measured a survey, etc.);

ii. a performance metric (e.g., the effectiveness of a bidder in obtaining results, etc.);

iii. a financial stability metric (e.g., the credit rating of the bidder, etc.);

iv. a delivery history metric (e.g., the percentage of packages delivered by the bidder on time, etc.); and v. a service metric (e.g., how often the bidder successfully completes repairs in only one service call, etc.).

It will be clear to those skilled in the art how to define and utilize other bid variables in embodiments of the present invention. Furthermore, it will be clear to those skilled in the art that the degree of discretion that a bidder has to affect the value of a particular bid variable can range from no discretion to absolute discretion.

When data processing system 101 receives a bid, it produces a resultant bid, $r_k$, for the bid, $b_k$. In some alternative embodiments of the present invention, a bidder can submit the resultant bid, $r_k$, with the m bid variables, $v_1$ through $v_m$, as part of the bid. In these embodiments, data processing system 101 advantageously reproduces the resultant bid, $r_k$, using its own parameters to verify the value of the resultant bid submitted.

In any case, the resultant bid, $r_k$, is advantageously determined from the m bid variables, $v_{1,k}$ through $v_{m,k}$, and c bid weights, $w_1$ through $w_c$. For the purposes of this specification, a "bid formula" is defined as the manner in which a plurality of bid variables are combined to produce a resultant bid. The general expression of the bid formula is depicted in Equation 1.

$$r_k = f(v_{1,k}, v_{2,k}, \ldots, v_{m,k}, w_1, w_2, \ldots, w_c) \qquad \text{(Eq. 1)}$$

In accordance with the illustrative embodiment, the resultant bid, $r_k$, is dimensioned in "equivalent dollars" for ease of description, which indicates that each of the c bid weights, $w_1$ through $w_c$, is dimensioned in units that when combined with the m bid variables, $v_{1,k}$ through $v_{m,k}$, produce an output dimensioned in equivalent dollars. In some alternative embodiments of the present invention, the resultant bid, $r_k$, is dimensioned differently or is a dimensionless quantity.

In accordance with the illustrative embodiment, each of the c bid weights is a constant. In some alternative embodiments of the present invention, one or more of the c bid weights is a linear or non-linear function of one or more of the bid variables (e.g., $w_3=f(v_3)$, $w_4=f(v_3, v_4)$, etc.). The function can be continuous (i.e., the derivative is defined over the range of interest) or discontinuous (i.e., the derivative is not defined everywhere within the range of interest).

Furthermore, in accordance with the illustrative embodiment, the signs of the c bid weights are chosen so that positive attributes of a bid (e.g., the fuel efficiency of an engine, etc.) have a different polarity than negative attributes of a bid (e.g., the amount of pollution created by an engine, etc.) to enable bid variables that indicate positive attributes of a bid to offset bid variables that indicate negative attributes of the bid. In any case it will be clear to those skilled in the art how to choose the respective values of the c bid weights, $w_1$ through $w_c$.

In accordance with the illustrative embodiment, the magnitude of the resultant bid, $r_k$, is a linear function of the value of each of the m bid variables, $v_{1,k}$ through $v_{m,k}$, as depicted in Equation 2.

$$r_k = \sum_{j=1}^{m} w_j v_{j,k} = w_1 v_{1,k} + w_2 v_{2,k} + \ddot{A} + w_m v_{m,k} \qquad (Eq.\ 2)$$

It will be clear to those skilled in the art how to make and use other bid formulas for use with other embodiments of the present invention. For example, it will be clear to those skilled in the art how to define a bid formula in which the magnitude of the resultant bid, $r_k$, is a nonlinear function of the value of at least one of the m bid variables, $v_{1,k}$ through $v_{m,k}$. For example, Equation 3 depicts an example of a bid formula in which the value of the resultant bid, $r_k$, is a function of 2 bid variables, $v_{1,k}$ and $v_{2,k}$, and 6 bid weights $w_1$ through $w_6$.

$$r_k = w_1 v_{1,k}^3 + w_2 v_{1,k}^2 + w_3 e^{v_{1,k}} + \frac{1}{w_4 v_{1,k} v_{2,k}} + w_5 \sin(w_6 v_{2,k}) \qquad (Eq.\ 3)$$

When the resultant bid, $r_k$, for two or more bids are computed, the resultant bids are ranked based on their relative magnitude. When the auction has concluded, the bid associated with the resultant bid whose magnitude is most advantageous to the auction solicitor is declared the winning bid.

A key aspect of the illustrative embodiment pertaining to the format of the auction involves partitioning the scope of the auction into a plurality of portions along one or more "dimensions." When the scope of an auction is partitioned along one or more dimensions, a bidder can bid on:

i. the entire scope, or ii. one or more portions of the scope in each dimension, or iii. both i and ii.

In this case, the auction solicitor advantageously prescribes how the scope is partitioned and promulgates this information as part of the format of the auction.

For example, the scope of an auction involving 100 office buildings in New York, New Jersey, and Connecticut, comprises many dimensions along which the scope can be partitioned. For example, one dimension is the state in which the buildings are situated and, therefore, the portions can be: a New York portion, a New Jersey portion, and a Connecticut portion. As another example, one dimension is the region in which the buildings are situated and, therefore, the portions can be: a New England portion (i.e., Connecticut) and a non-New England portion (i.e., New York and New Jersey). As yet another example, one dimension is based on the height of the buildings, and, therefore, the portions can be: a high-rise portion and a low-rise portion, or alternatively, buildings 1-5 stories, buildings 6-13 stories, buildings 14-23 stories, and buildings over 23 stories. As still another example, one dimension is the number of employees in the buildings, and, therefore, the portions can be: buildings with fewer than 400 employees and buildings with 400 or more employees. From these examples, it is clearly shown that there are many dimensions along which the scope of an auction can be partitioned and many ways in which each dimension can be partitioned.

When the scope of an auction is partitioned along a dimension, the sum of the portions in that dimension must equal the entire scope of the auction. It will be clear to those skilled in the art how to determine the dimensions along which the scope of an auction can be partitioned. Furthermore, it will be clear to those skilled in the art how to partition the scope in each dimension.

When the scope of an auction is partitioned, the winner(s) of the auction is determined in three steps. In the first step, a candidate winning bid for the entire scope is determined, provided that there is at least one bid for the entire scope. The candidate winning bid for the entire scope is the bid for the entire scope that is most advantageous to the auction solicitor.

In the second step, the candidate winning bid for each portion of each dimension is determined. If there is not at least one bid for each portion in a given dimension, then all of the bids for all of the portions in that dimension are disqualified because no combination of bids for portions in that dimension will equal the entire scope of the auction. The candidate winning bid for each portion is the bid for that portion that is most advantageous to the auction solicitor.

In the third step, the winner of the auction is determined by deciding which of:

i. the candidate winning bid for the entire scope, or ii. the sum of the candidate winning bids for each portion in each dimension is more advantageous to the auction solicitor.

An example of how the scope of an auction is partitioned into multiple dimensions is useful for pedagogical purposes. In accordance with the example, the scope of an auction is defined as the purchase and installation of 90 air conditioners for 90 office buildings in Maryland and Virginia in consideration for cash. To simplify this example, the scope of this auction includes only one bid variable, cash, which is dimensioned in terms of money. It will be clear to those skilled in the art, however, after reading this specification, how to make and use embodiments of the present invention that conduct auctions with partitioned scope and multiple bid variables.

To continue with the facts in the example, thirty-five of the buildings needing air conditioners are high-rises and require specialized equipment to install the air conditioners while the remainder of the buildings require no such specialized equipment. Twenty-one of the high rise buildings are in Maryland and fourteen are in Virginia. There are 25 low-rise buildings in Maryland and 30 in Virginia. The distribution of buildings between high-rise and low-rise and between Maryland and Virginia is depicted in Table 1.

TABLE 1

Bids in Illustrative Partitioned Auction

| Scope | Maryland | Virginia | Total |
|---|---|---|---|
| High-Rise | 21 | 14 | 35 |
| Low-Rise | 25 | 30 | 55 |
| Total | 46 | 44 | 90 |

Because the auction solicitor appreciates that aggregated bids might be more advantageous than bids for the entire scope, the auction solicitor partitions the scope of the auction along two dimensions. In the first dimension, the scope of the auction is partitioned into a Maryland portion and a Virginia portion. In the second dimension, the scope of the auction is partitioned into a high-rise portion and a low-rise portion.

The auction receives 15 bids from 6 bidders, as shown in Table 1.

TABLE 2

Bids in Illustrative Partitioned Auction

| Bid | Bid-der | Entire Scope | Maryland Portion | Virginia Portion | High-Rise Portion | Low-Rise Portion |
|---|---|---|---|---|---|---|
| 1 | 1 | $925,000 | | | | |
| 2 | 1 | | $455,000 | | | |
| 3 | 1 | | | $450,000 | | |
| 4 | 1 | | | | $600,000 | |
| 5 | 1 | | | | | $275,000 |
| 6 | 2 | $945,000 | | | | |
| 7 | 2 | | | | $580,000 | |
| 8 | 2 | | | | | $325,000 |
| 9 | 3 | | $430,000 | | | |
| 10 | 3 | | | | $590,000 | |
| 11 | 4 | $965,000 | | | | |
| 12 | 4 | | | | | $305,000 |
| 13 | 5 | | | | $575,000 | |
| 14 | 6 | | $440,000 | | | |
| 15 | 6 | | | | | $295,000 |

After the bids have been received, the winner or winners of the auction are determined.

In the first step, a candidate winner for the entire scope is determined. As can be seen in Table 2, Bidder #1 (with Bid #1) has the candidate winning bid for the entire scope with $925,000.

In the second step, a candidate winner for each portion is determined.

Because there is at least one bid in each portion of the scope as partitioned into Maryland and Virginia portions, the candidate winner for the Maryland portion and the Virginia portion is determined. As can be seen in Table 2, the candidate winner of the Maryland portion is Bidder #3 (with Bid #9) with $430,000, and the candidate winner of the Virginia portion is Bidder #1 (with Bid #3) with $450,000.

Because there is at least one bid in each portion of the scope as partitioned into high-rise and low-rise portions, the candidate winner for the high-rise portion and the low-rise portion is determined. As can be seen in Table 2, the candidate winner of the high-rise portion is Bidder #4 (with Bid #13) with $575,000 and the candidate winner of the low-rise portion is Bidder #1 (with Bid #5) with $275,000.

In the third step, the winner of the auction is determined by determining which of:
  i. the candidate winning bid for the entire scope (i.e., $925,000), or
  ii. the sum of the candidate winning bids as partitioned into the Maryland and Virginia portions (i.e., $430,000+$450,000=$880,000), or
  iii. the sum of the candidate winning bids as partitioned into high-rise and low-rise portions (i.e., $575,000+$275,000=$850,000) is the most advantageous to the auction solicitor.

Because the sum of the candidate winning bids as partitioned into high-rise and low-rise portions is the most advantageous to the auction solicitor, Bidder #4 is awarded the high-rise portion of the auction and Bidder #1 is awarded the low-rise portion of the auction. In this example, the auction solicitor saved $75,000 ($925,000-$850,000) by partitioning the scope into a high-rise portion and a low-rise portion in contrast to proscribing the partitioning the auction.

In some alternative embodiments of the present invention, a bidder can submit a single bid for a subcombination of the portions of the scope and in this case the subcombination is evaluated by comparing it to the sum of the best bids for the same portions as are in the subcombination.

With continuing reference to FIG. 4, it will be seen at subtask 403 that the scope of the auction and the format of the auction is promulgated to candidate bidders. This can be achieved, illustratively, via:
  1. data network 104 (e.g., the Internet, a private data network, a local area network, a wireless data network, etc.), or
  2. telephone network 105 (e.g., the Public Switched Telephone Network, a wireless telephony network, etc.), or
  3. courier 106 (e.g., Federal Express, the U.S. Mail, publication in a newspaper, publication in a periodical, etc.), or
  4. in person by being co-located with local input/output device 202 (shown in FIG. 2) of data processing system 101, or
  5. any combination of i, ii, iii, and iv.

Figure 5:
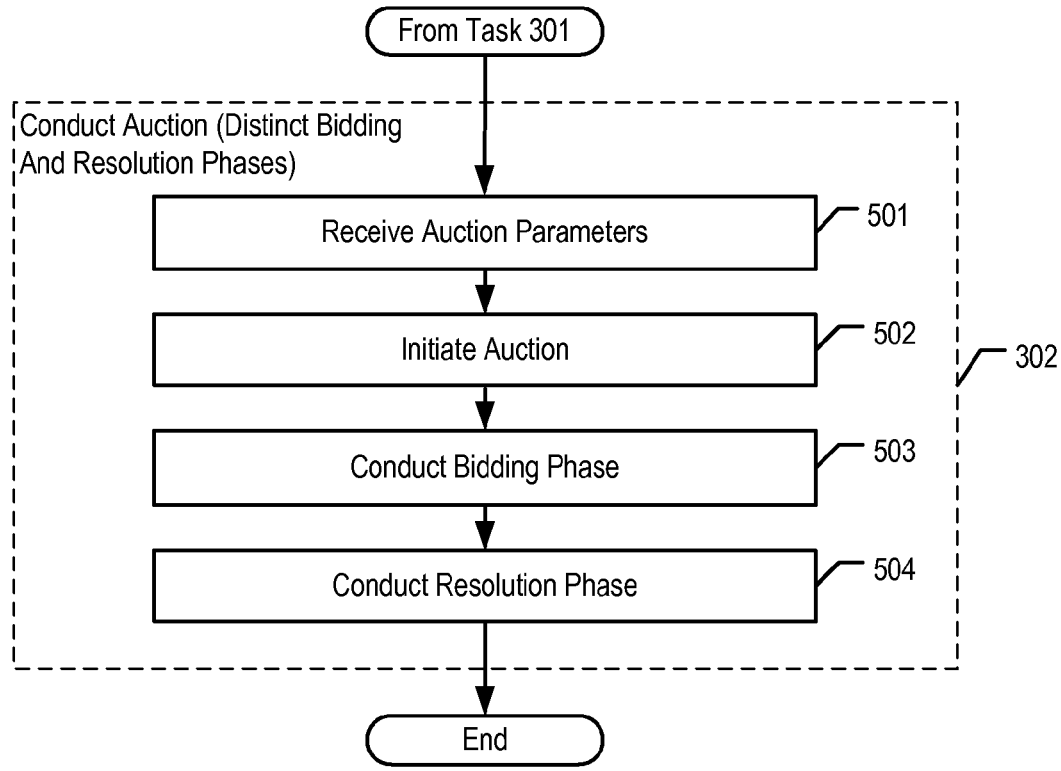
FIG. 5 depicts a flowchart of the tasks associated with conducting an auction as depicted in FIG. 3.

FIG. 5 depicts a flowchart of the subtasks that compose task 302. In accordance with the illustrative embodiment of the present invention, the auction conducted pursuant to task 302 is a sealed-bid auction, and, therefore, has distinct bidding and resolution phases. In some alternative embodiments of the present invention, however, task 302 is a non-sealed bid auction with combined bidding and resolution phases.

At subtask 501, the auction parameters (e.g., the scope of the auction, the format of the auction, the bid formula, etc.), are received by data processing system 101. This enables data processing system 101 to conduct the auction in accordance with the auction parameters.

At subtask 502, the auction is initiated. In accordance with the illustrative embodiment of the present invention, data processing system 101 signals the beginning of the auction. When the specified auction format includes separate bidding and resolution phases, data processing system 101 advantageously signals the beginning and ending of each phase. When the specified auction format includes multiple bidding rounds, data processing system 101 advantageously signals the beginning and ending of each round. In any case, it will be clear to those skilled in the art how to initiate the auction.

At subtask 503, the bidding phase of the auction is conducted. In accordance with the illustrative embodiment, the bidding phase comprises receiving bid packages, preparing bids, and entering bids into the auction, in addition to other subtasks. Subtask 503 is described in detail below and with respect to FIG. 6.

At subtask 504, the resolution phase of the auction is conducted. In accordance with the illustrative embodiment, the resolution phase comprises publishing the contents of the bids in the auction, identifying the bidders, and identifying the winning bid and bidder, in addition to other subtasks. Subtask 504 is described in detail below and with respect to FIG. 7.

FIG. 6 depicts a flowchart of the subtasks that compose subtask 503, as depicted in FIG. 5.

At subtask 601, T bid packages, $bp_k$, wherein k=1 to T, are received by data processing system 101, wherein T is a positive integer greater than zero. In accordance with the illustrative embodiment, the bid packages can be received by data processing system 101 concurrently or periodically or sporadically during the auction, as specified by the format of the auction.

In accordance with the illustrative embodiment, each bid package, $bp_k$, is received by data processing system 101 via:
  i. data network 104 (e.g., the Internet, a private data network, a local area network, a wireless data network, etc.), or
  ii. telephone network 105 (e.g., the Public Switched Telephone Network, a wireless telephony network, etc.), or
  iii. courier 106 (e.g., Federal Express, the U.S. Mail, publication in a newspaper, publication in a periodical, etc.), or
  iv. in person by being co-located with local input/output device 202 (shown in FIG. 2) of data processing system 101, or
  v. any combination of i, ii, iii, and iv.

In accordance with the illustrative embodiment, each bid package, $bp_k$, comprises at least:
  1. a direction to enter a bid, $b_k$, into the auction;
  2. a value for each of the m bid variables, $v_{1,k}$ through $v_{m,k}$, associated with the bid;
  3. one or more indicium that the bid satisfies the mandatory and non-discretionary aspects of a qualified bid; and
  4. one or more indicium that the bidder satisfies the mandatory and non-discretionary aspects of a qualified bidder.

In accordance with the illustrative embodiment, the value of each of the m bid variables, $v_{1,k}$ through $v_{m,k}$, is:
  i. explicitly stated in the bid package; or
  ii. implicitly stated in the bid package; or
  iii. to be determined by data processing system 101 by reference to a default value; or
  iv. to be determined by data processing system 101 by reference to publicly-available information; or
  v. to be determined by data processing system 101 by reference to private information (e.g., by reference to the contents of another bid, etc.); or
  vi. to be determined in accordance with any combination of i, ii, iii, iv, and v.

For example, the first bid package from each bidder advantageously explicitly states a value for each of the m bid variables, $v_{1,k}$ through $v_{m,k}$, that are not determined by default or incorporated by reference. Furthermore, subsequent bid packages advantageously only explicitly state a value for those bid variables whose value has changed from the last bid. In this case, the bid variables whose value has not changed from the previous bid can be reasonably deemed to be implicitly stated in the bid package.

The auction format might indicate a default value for one or more of the m bid variables, $v_{1,k}$ through $v_{m,k}$, such that a bid package need not explicitly state a value for those bid variables unless the bidder desires to override the default value.

Furthermore, in accordance with the illustrative embodiment, a bidder can program data processing system 101 to prepare and enter one or more bids in behalf of the bidder (i.e., by proxy). To this end, a bidder submits a bid package, $bp_k$, to data processing system 101, which bid package directs data processing system 101 to prepare and enter one or more bids into an auction under certain specified terms and conditions. As part of preparing the bid, data processing system 101 can determine some or all of the bid variables to be included in the bid. To this end, the capabilities offered by data processing system 101 include, but are not limited to, determining whether or not to prepare and enter a bid based, at least in part, on:
  i. the identity of one or more bidders in auction,
  ii. the absence of one or more bidders from an auction, or
  iii. the bid variables in one or more other bids, or
  iv. the current ranking of the bids, or
  v. the results of another auction, or
  vi. any combination of i, ii, iii, iv, and v.

Furthermore, the capabilities offered by data processing system 101 include, but are not limited to, determining one or more bid variables based, at least in part, on:
  i. the identity of one or more bidders in an auction, or
  ii. the absence of one or more bidders from an auction, or
  iii. the bid variables in one or more other bids, or
  iv. the current ranking of the bids, or
  v. the results of another auction, or
  vi. default values, or
  vii. any combination of i, ii, iii, iv, v, and vi.

The following discussion amplifies each of these capabilities in detail.

Determining one or more bid variables based, at least in part, on the identity of one or more bidders in an auction. The illustrative embodiment provides this capability because of the recognition that the mere knowledge of the participation of a first bidder in an auction might affect a second bidder's decision-making in crafting its bid. This is true even though the second bidder has no knowledge whatsoever about the first bidder's bid.

For example, if the second bidder knew that the first bidder submitted a bid in a sealed-bid auction and the second bidder knew that the first bidder normally won the auctions it entered, the knowledge of the first bidder's participation in the auction might cause the second bidder to submit a more aggressive bid than it would otherwise. The capability is particularly, although not exclusively, useful in sealed-bid auctions.

Determining one or more bid variables based, at least in part, on the absence of one or more bidders from an auction. The illustrative embodiment provides this capability because of the recognition that the mere knowledge of the absence of a first bidder in an auction might affect a second bidder's decision-making in crafting its bid.

For example, if the second bidder knew that a first bidder had not submitted a bid in a sealed-bid auction and the second bidder knew that the first bidder normally won the auctions it entered, the knowledge of the first bidder's absence from the auction might cause the second bidder to submit a less aggressive bid that it would otherwise.

For example, only manufacturers A and B can offer a 5-year warranty for their product, while all other manufacturers can only offer a 3-year warranty. Therefore, if manufacturer A does not enter a bid into the auction, B might only want to offer a 3-year warranty, even though it can offer a 5-year warranty if it needs to.

The capability is particularly, although not exclusively, useful in sealed-bid auctions.

Determining one or more bid variables based, at least in part, on the bid variables in one or more other bids. The illustrative embodiment provides this capability because of the recognition that a first bidder might desire to have aspects of its bid track aspects of other bids. For the purposes of this specification, the "tracking" of a bid variable does not necessarily mean the outbidding or overtaking of another bid variable.

For example, in some cases a first bidder might direct data processing system 101 to set a value for a bid variable that is more advantageous to the auction solicitor than the value of the same bid variable in a second bidder's bid. In some other cases, the first bidder might direct data processing system 101 to set a value for a bid variable that is equally advantageous to the auction solicitor as the value of the same bid variable in the second bidder's bid. In yet some other cases, the first bidder might direct data processing system to set the value for a bid variable that is less advantageous to the auction solicitor than the value of the same bid variable in the second bidder's bid.

This capability is particularly, although not exclusively, useful in sealed-bid auctions. In accordance with the illustrative embodiment, the contents of the bids in a sealed-bid auction are withheld from all of the entities outside of data processing system 101 (e.g., the auction solicitor, the bidders, etc.) by data processing system 101 until the bidding phase is over, but data processing system 101 itself can "see" and use the contents of sealed bids as the basis for determining bid variables for other sealed bids.

Determining one or more bid variables based, at least in part, on the results of another auction. The illustrative embodiment provides this capability because of the recognition that economic circumstances often compel a bidder to participate in a plurality of contemporaneous auctions such that the winning of too many auctions could be as disastrous to the bidder as winning too few auctions.

For example, a building contractor might need between $80 million and $100 million worth of building contracts in the next year. If the contractor receives substantially less than $80 million in contracts, it might incur substantial loses. In contrast, if the contractor receives substantially more than $100 million in contracts, it might not have the resources to be able to manage all of the contracts properly, which could damage its reputation. Therefore, the contractor might endeavor to ensure that it has between $80 million and $100 million worth of building contracts in the next year.

To continue with this example, suppose that the contractor already has $40 million in building contracts for the next year. Suppose further that the contractor has decided to bid on two building contracts, each for $50 million, and that the auctions for the two contracts will overlap in time. Clearly, the contractor would like to win one, but not two, contracts.

If the contractor wins the first auction, then it must withdraw from the second auction. In contrast, if the contractor loses the first auction, then it must be aggressive in the second auction. The illustrative embodiment enables a bidder, therefore, to direct data processing system 101 to determine one or more bid variables, based, at least in part, on the results of another auction. This capability is equally useful in sealed-bid and non-sealed-bid auctions.

Determining one or more bid variables based, at least in part, on default values. The illustrative embodiment provides this capability because of the recognition that default values for bid variables are convenient for bidders, the auction solicitor, and the auctioneer (i.e., data processing system 101).

For example, when the scope of the auction is defined, a default value for each optional and discretionary aspect of the bid is provided. Thereafter, each bid variable in a bid is assumed to have the default value for that bid variable unless the bid explicitly provides otherwise.

This capability is equally useful in sealed-bid and non-sealed-bid auctions.

At subtask 602 a bid is prepared in accordance with the directions as specified in the bid package. In accordance with the illustrative embodiment, each bid, $b_k$, comprises at least:
i. an explicit value for each of the m bid variables, $v_{1,k}$ through $v_{m,k}$;
ii. one or more indicium that the bid satisfies the mandatory and non-discretionary aspects of a qualified bid; and
iii. one or more indicium that the bidder satisfies the mandatory and non-discretionary aspects of a qualified bidder.

Regardless of whether each bid variable was explicitly stated in the bid package or implicitly stated in the bid package or determined by data processing system 101 by reference to a default value or determined by data processing system 101 by reference to publicly-available information or determined by data processing system 101 by reference to private information or determined in accordance with any combination of these, data processing system 101 advantageously determines the explicit value for each bid variable, when necessary, and includes it with the bid. In other words, even when bid package does not comprise an explicit value for a bid variable, the bid associated with the bid package does explicitly comprise an explicit value for the bid variable. A bid package, $bp_k$, might instruct data processing system 101 to determine the value of one or more of the m bid variables, $v_{1,k}$ through $v_{m,k}$, by reference to public or private information. For example, data processing system 101 might be instructed to determine the value of a bid variable by reference to another bidder's bid (e.g., $v_{k,1}$ equals $v_{k-1,1}$ plus $50, etc.), other bid variables of bidder's bid, or the financial markets (e.g., $v_{1,k}$ equals the S&P 500 index at 10:00 AM today minus 25.00, etc.).

At subtask 603, data processing system 101 waits, if appropriate, a specific or random amount of time before entering a bid in behalf of a bidder. The illustrative embodiment provides this capability because of the recognition that a first bidder might desire to disguise the fact that its bids are being determined and entered by proxy.

For example, when a first bidder enters a bid into an auction and another bid from a second bidder is immediately entered thereafter, the first bidder might suspect that the second bidder's bid is being determined and entered by data processing system 101. This suspicion, if true, could affect the first bidder's decision-making in subsequent or revised bids to the detriment of the second bidder.

Therefore, to alleviate this situation, the illustrative embodiment enables the second bidder to direct data processing system 101 to wait a specific or random amount of time after the first bidder's bid has been entered into the auction before entering the second bidder's bid into the auction.

This capability is particularly, although not exclusively, useful in non-sealed-bid auctions.

At subtask 604, data processing system 101 enters the bid prepared in subtask 602 into the auction in behalf of the bidder.

At subtask 605, data processing system 101 determines whether each bid received in subtask 604 is a qualified bid by, for example, comparing the one or more indicium that the bid satisfies the mandatory and non-discretionary aspects of a qualified bid. When the bid does not qualify, it is void or voidable at the election of auction solicitor 102. In accordance with the illustrative embodiment, data processing system 101 can, of its own initiative, retrieve publicly-available information or private information and can determine, in whole or in part, by reference to the retrieved information whether a bid received in subtask 604 is qualified.

At subtask 606, data processing system 101 determines whether each bidder who submitted a bid that was received in subtask 604 is a qualified bidder by, for example, checking the one or more indicium that the bid satisfies the mandatory and non-discretionary aspects of a qualified bid against the mandatory and non-discretionary aspects of the bidder as defined in the scope of the auction. When the bidder does not qualify, that bidder's bids are void or voidable at the discretion of auction solicitor 102. In accordance with the illustrative embodiment, data processing system 101 can, of its own initiative, retrieve publicly-available information or private information and can determine, in whole or in part, by reference to the retrieved information whether a bidder who submitted a bid that was received in subtask 604 is qualified.

At subtask 607, data processing system 101 determines a resultant bid, $r_k$, for the bid, $b_k$, based on the bid formula received in subtask 501 and on the m bid variables, $v_{1,k}$ through $v_{m,k}$, stated in bid, $b_k$. In auctions that are partitioned, the subtask of determining the resultant bid also comprises determining the resultant bids for each portion of the scope of the auction as well as for bids for the entire scope of the auction.

At subtask 608, data processing system 101 ranks the resultant bids, $r_k$, for k=1 to T, by comparing the relative magnitude of the resultant bids and their relative advantageousness to auction solicitor 102 as defined in the format of the auction. This is advantageously done for both qualifying bids and unqualified bids and for bids from both qualifying bidders and unqualified bidders. For unqualified bids and bids from unqualified bidders, data processing system 101 publishes with each resultant bid an indicium that the resultant bid is unqualified or is a qualified bid from a unqualified bidder or both. This informs all of the bidders that that bid is void or voidable at the election of auction solicitor 102, and, therefore, need not necessarily be overcome to win the auction. In other words, a bidder might not feel the need to overcome a candidate winning (but unqualified) bid to win the auction when the bidder is confident that the auction solicitor will void the candidate winning (but unqualified) bid.

In some alternative embodiments of the present invention, data processing system 101 merely searches through the T resultant bids, without ranking them all, to find the resultant bid that is most advantageous to auction solicitor 102. Furthermore, in some alternative embodiments of the present invention, unqualified bids and qualified bids from unqualified bidders are not published by data processing system 101. And still furthermore, in some alternative embodiments of the present invention, unqualified bids and qualified bids from unqualified bidders are not considered by data processing system 101 at all (e.g., for the purposes of determining whether an auction should end without further bidding or should have another round of bidding, etc.).

It should be understood that each bid comprises multiple bid variables not merely to break a tie between two bids that have the same value for one bid variable, but so that bids that have no ties in any one bid variables can be compared and ranked. That is not to say that two bids in accordance with the present invention cannot have the same value for a bid variable, but that the values of all of the bid variables affect the outcome of an auction. In some alternative embodiments of the present invention, however, no two bids have the same value for any one bid variable (i.e., $v_{q,1}$ does not equal $v_{q,2}$, for q=1 to m) in one auction.

At subtask 609, data processing system 101 publishes the ranking for the resultant bids, $r_k$, for k=1 to T, if appropriate in accordance with the auction format. In accordance with the illustrative embodiment, the ranking for the resultant bids are published for non-sealed bid auctions.

Furthermore, in accordance with the illustrative embodiment, the ranking for the resultant bids are published for sealed-bid auctions during the bidding phase and before the resolution phase. The illustrative embodiment provides this capability because of the recognition that it makes sealed-bid auctions more competitive. This does not disclose the contents of a sealed-bid to any party, but merely informs each bidder where its bid currently stands and enables each bidder to decide whether it desires to submit a revised bid in the hope of improving its ranking.

At subtask 610, data processing system 101 determines if there is another bid (from a previously received bid package) to be prepared and entered into the auction. Events that could cause another bid to be entered into the auction include, but are not limited to, the entry of the last bid into the auction, the results of another auction, or a change in publicly-available information (e.g., a change in interest rates, etc.). When data processing system 101 determines that another bid is to be prepared and entered into the auction, control passes to subtask 602. Otherwise control passes to step 611.

At subtask 611, data processing system 101 determines if another bid package has been received and if the bidding phase of the auction permits the entry of another bid into the auction. When data processing system 101 determines that another bid package has been received and if the bidding phase of the auction permits the entry of another bid into the auction, control passes to subtask 504. Control only passes to subtask 504 when the bidding phase of the auction is over.

Figure 7:
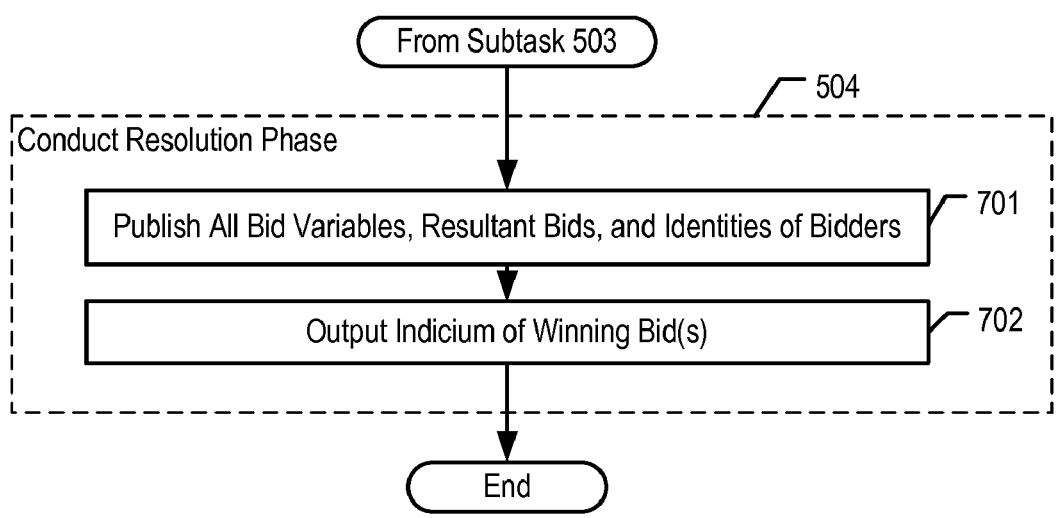
FIG. 7 depicts a flowchart of the subtasks that compose subtask 504, as depicted in FIG. 5.

FIG. 7 depicts a flowchart of the subtasks that compose subtask 504, as depicted in FIG. 5.

At subtask 701, data processing system 101 publishes each bid, $b_k$, the value of the m bid variables, $v_{1,k}$ through $v_{m,k}$, the resultant bid, $r_k$, for the bid, $b_k$, the ordinal ranking of each resultant bid, $r_k$, an indicium of whether the bid is qualified or not, and an indicium of whether the bidder who made the bid is qualified or not, to auction solicitor 102 and bidders 103-1 through 103-n via:

i. data network 104 (e.g., the Internet, a private data network, a local area network, a wireless data network, etc.), or ii. telephone network 105 (e.g., the Public Switched Telephone Network, a wireless telephony network, etc.), or iii. courier 106 (e.g., Federal Express, the U.S. Mail, publication in a newspaper, publication in a periodical, etc.), or iv. in person by being co-located with local input/output device 202 (shown in FIG. 2) of data processing system 101, or v. any combination of i, ii, iii, and iv.

In auction formats that have distinct bidding and resolution phases, subtasks 505 and 506 are advantageously performed after all of the bids have been received in subtask 503. In auction formats that combine the bidding and resolution phases, subtasks 505 through 506 are advantageously performed after each bid is received in subtask 503. In other words, in auction formats that combine the bidding and resolution phases, subtasks 504 through 509 are performed after each bid is received.

It should be understood that subtasks 503 through 509 are performed concurrently in auctions with combined bidding and resolution phases (e.g., sealed-bid auctions, etc.) and for each bid entered into the auction.

At subtask 702, data processing system 101 outputs an indicium of the winning bid (when the auction format specifies that there is one winning bid) or bids (when the auction format specifies that there is more than one winning bid) when the auction format indicates that the auction has ended. This information is advantageously distributed to auction solicitor 102 and bidders 103-1 through 103-n via:

i. data network 104 (e.g., the Internet, a private data network, a local area network, a wireless data network, etc.), or ii. telephone network 105 (e.g., the Public Switched Telephone Network, a wireless telephony network, etc.), or iii. courier 106 (e.g., Federal Express, the U.S. Mail, publication in a newspaper, publication in a periodical, etc.), or iv. in person by being co-located with local input/output device 202 (shown in FIG. 2) of data processing system 101, or v. any combination of i, ii, iii, and iv.

As indicated above, for pedagogical purposes the illustrative embodiment is now described in conjunction with an example. In accordance with the example, an auction solicitor desires to purchase a truck and defines the scope of the auction as follows:

The auction solicitor seeks to acquire a truck in consideration for cash.

The mandatory and non-discretionary requirements of a qualified bid are:

the truck must have a diesel engine,
   the truck must have a minimum engine size of 400 horsepower,
   the truck must have a minimum hauling capacity of 20 tons,
   the truck must have a two-year warranty or longer,
   the truck must have a maximum height of 13 feet, and
   the purchase of the truck must be financed by the winning bidder.

The optional or discretionary aspects of a qualified bid (i.e., some of the bid variables) are:

the engine size of the truck (in excess of 400 hp),
   the hauling capacity of the truck (in excess of 20 tons),
   the color of the truck,
   the length of the warranty (in excess of 2 years),
   the fuel efficiency of the truck,
   the $CO_2$ emissions of the truck, and
   the price of the truck.

The mandatory and non-discretionary requirements of a qualified bidder are:

the bidder must have sold trucks for at least three years, and
   the bidder must have a repair facility within 50 miles of the auction solicitor's location.

The optional or discretionary aspects of a qualified bidder (i.e., more bid variables) are:

the distance of the bidder's repair facility from the auction solicitor's location, and
   the interest rate that the bidder will charge the auction solicitor in financing the sale of the truck.

In accordance with the illustrative auction, the auction solicitor defines the format of the auction as follows: The auction will be a single-round, sealed-bid auction. The bidding phase will begin on Jun. 30, 2002 at 3:00 PM EST and will end on Jul. 7, 2002 at 5:00 PM EST. A bid package can be submitted to data processing system 101 at any time during the bidding phase. A bidder can revise its current bid at any time during the bidding phase. A revised bid must have a resultant bid that is more advantageous to the auction solicitor than the current bid. Upon the entry of a bid into the auction, the bid will be evaluated (to ensure that it is a qualified bid from a qualified bidder) and ranked. The current ranking of all pending bids will be published immediately (i.e., during the bidding phase and before the resolution phase). The resolution phase of the auction will begin at Jul. 7, 2002 at 5:00 PM EST. There is only one unit being sought, and, therefore, there will only be one winning bid. The bid variables are depicted in Table 3.

TABLE 3

Bid Variables for the First Illustrative Auction

| Bid Variable | Description | Default Values |
|---|---|---|
| $v_1$ | the engine size of the truck (in horsepower) | 400 hp |
| $v_2$ | the hauling capacity of the truck (in tons) | 20 tons |
| $v_3$ | the color of the truck (1 for a yellow truck; 0 for any other color truck) | 1 |
| $v_4$ | the length of the warranty (in years) | 2 |
| $v_5$ | the fuel efficiency of the truck (in miles per gallon) | none |
| $v_6$ | the $CO_2$ emissions of the truck (in pounds per gallon of fuel) | none |
| $v_7$ | the price of the truck (in dollars) | none |
| $v_8$ | the distance of the bidder's repair facility from the auction solicitor's location (in miles) | 50 |
| $v_9$ | the interest rate that the bidder will charge the auction solicitor in financing the sale of the truck (in annualized basis points) | none |

The auction solicitor has decided that the bid formula for bid, $b_k$, is:

$$r_k = w_1(v_{1,k}-400) + w_2(v_{2,k}-20) + w_3 v_{3,k} + w_4 v_{4,k} + w_5(v_{5,k}-2) + w_6 v_{6,k} + w_7 v_{7,k} + w_8 v_{8,k} + w_9 v_{9,k} \quad \text{(Eq. 4)}$$

and that the winning bid will be the bid with the smallest resultant bid at the end of the auction.

The auction solicitor has decided that the nine bid variables have the relative value to the auction solicitor defined by the following bid weights:

TABLE 4

Bid weights for the First Illustrative Auction

| Bid Weight | Comment |
|---|---|
| $w_1$ = −$30 per horsepower (in excess of 400 hp) | note that $v_1 \geq 400$ to be a qualified bid |
| $w_2$ = −$150 per ton (in excess of 20 tons) | note that $v_2 \geq 20$ to be a qualified bid |
| $w_3$ = −$500 | |
| $w_4$ = −$1000 per year of warranty (in excess of 2 years) | note that $v_4 \geq 2$ to be a qualified bid |
| $w_5$ = −$50 per mpg | |
| $w_6$ = +$10 per pound of $CO_2$ per gallon of fuel | |
| $w_7$ = +1 | |
| $w_8$ = +$20 per mile | note that $v_8 < 50$ to be a qualified bid |
| $w_9$ = +$5 per annualized basis point | |

The scope of the auction and the format of the auction are then promulgated to candidate bidders. Note that $w_1$, $w_2$, $w_3$, $w_4$, and $w_5$ are negative because higher values of bid variables $v_1$, $v_2$, $v_3$, $v_4$, and $v_5$ are more advantageous to the auction solicitor than lower values, and $w_6$, $w_7$, $w_8$, and $w_9$ are positive because lower values of bid variables $v_6$, $v_7$, $v_8$, and $v_9$ are more advantageous to the auction solicitor than higher values.

When the auction commences, a first bidder, Dodge Trucks, submits a first bid package, $bp_1$, to data processing system 101 directing data processing system 101 to prepare and enter one bid with the following bid variables:

TABLE 5

Bid Variables for Bid 1

| Bid Variable | Value |
| --- | --- |
| $v_{1,1}$ | 405 horsepower |
| $v_{2,1}$ | 25 tons |
| $v_{3,1}$ | Blue = 0 |
| $v_{4,1}$ | the default value (which data processing system 101 determines to be 2 Years) |
| $v_{5,1}$ | 16 mpg |
| $v_{6,1}$ | 2 pounds of $CO_2$ per gallon of fuel |
| $v_{7,1}$ | $258,000 |
| $v_{8,1}$ | 28 miles |
| $v_{9,1}$ | today's federal funds rate plus 25 basis points (which data processing system 100 determines to be 550 basis points) |

The first bid package, $bp_1$, also directs data processing system 101 to prepare and enter into the auction one or more revised bids in behalf of the first bidder in the event that bids are received in the auction that outrank the first bidder's current bid. Furthermore, the first bid package, $bp_1$, also directs data processing system 101 to prepare and enter those bids in accordance with the following guidelines.

1. use the same values for each bid variable in the revised bid as used in the previously entered bid, with the following exceptions as listed in items 2 through 6;
2. if Mack Trucks enters the auction, decrease the value of bid variable $v_7$ by $3000 and increase the value of bid variable $v_4$ to four years;
3. if Ford Trucks enters the auction, change the value of bid variable $v_3$ to Yellow;
4. if the first bidder has won Auction #45,325 in data processing system 101, increase the value of bid variable $v_7$ by $250;
5. ensure that the value of the bid variable $v_1$ is within 25 hp of that in the current leading bid; and
6. wait between 4 and 9 hours to enter the bid into the auction.

After the first bid has been received, T=1. After the first bid and first bidder are determined to be qualified, data processing system 101 uses the bid formula (Equation 4) and the bid weights as defined in Table 4, to generate the resultant bid, $r_1$, which equals: $259,630. Data processing system 101 then promulgates the bid variables and resultant bid.

After the first bid was entered into the auction and before a second bid was entered into the auction, the first bidder won Auction #45,325 in data processing system 101. This fact will be considered by data processing system 101 in the even that it prepares another bid for the first bidder.

Subsequently, a second bid, $b_2$, is submitted by a second bidder, Ford Trucks, to data processing system 101 with the following bid variables:

TABLE 6

Bid Variables for Bid 2

| Bid Variable | Value |
| --- | --- |
| $v_{1,2}$ | 425 horsepower |
| $v_{2,2}$ | 28 tons |
| $v_{3,2}$ | Red = 0 |
| $v_{4,2}$ | 2 Years |
| $v_{5,2}$ | 14 mpg |
| $v_{6,2}$ | 2.5 pounds of $CO_2$ per gallon of fuel |
| $v_{7,2}$ | $259,000 |
| $v_{8,2}$ | 16 miles |
| $v_{9,2}$ | 560 basis points |

After the second bid has been received, T=2. After the second bid and second bidder are determined to be qualified, data processing system 101 uses the bid formula (Equation 4) and the bid weights as defined in Table 4, to generate the resultant bid, $r_2$, which equals: $259,495. Data processing system 101 then ranks the two bids, with the smaller resultant bid being the more advantageous to the auction solicitor, and, therefore, the current leader.

TABLE 7

Ranking of Resultant Bids After Two Bids Have Been Submitted

| | |
| --- | --- |
| $r_2$ | $259,495 |
| $r_1$ | $259,630 |

It is important to note that even though the price (i.e., bid variable $v_{7,2}$) of the truck in the second bid is $1000 greater than the price (i.e., bid variable $v_{7,1}$) of the truck in the first bid, the other optional and discretionary aspects of the bid indicate that the second bid is of greater value to the auction solicitor than the first bid. This is why the second bid is the current leading bid.

Data processing system 101 then promulgates the ranking of the resultant bids and an indicium of the identity of the associated bidders, but withholds the values of the bid variables and the resultant bids.

In response to the entry of the second bid into the auction and the directions in the first bid package, $bp_1$, data processing system 100 prepares a third bid, $b_3$, for entry into the auction in behalf of the first bidder. In accordance with the guidelines in the first bid package, $bp_1$, a third bid is entered into the auction with the following bid variables:

TABLE 8

Bid Variable for Bid 3

| Bid Variable | Value |
| --- | --- |
| $v_{1,3}$ | 405 horsepower |
| $v_{2,3}$ | 25 tons |
| $v_{3,3}$ | Yellow = 1 |
| $v_{4,3}$ | 2 Years |
| $v_{5,3}$ | 16 mpg |
| $v_{6,3}$ | 2 pounds of $CO_2$ per gallon of fuel |
| $v_{7,3}$ | $258,250 |

TABLE 8-continued

Bid Variable for Bid 3

| Bid Variable | Value |
| --- | --- |
| $v_{8,3}$ | 28 miles |
| $v_{9,3}$ | 550 basis points |

Note that the values of the bid variables in the third bid are the same as those in the first bid with the exception of $v_3$ and $v_7$. Bid variables $v_3$ and $v_7$ were changed because:
1. Ford Trucks entered the auction, and, therefore, data processing system 101 changed the value of bid variable $v_3$ to Yellow as it was instructed to do; and
2. the first bidder won Auction #45,325 in data processing system 101, and, therefore, data processing system 101 increased the value of bid variable $v_7$ by $250 as it was instructed to do.

Furthermore, it should be understood that the value of the bid variable $v_1$ is within 25 hp of that in the current leading bid (25 hp≧425 hp minus 405 hp).

Although the third bid was ready for entry into the auction moments after the second bid had been entered, data processing system 101 waited 5 hours and 12 minutes before entering the third bid into the auction for the first bidder.

After the third bid has been received, T=3. Note that in the third bid, the first bidder has offered the truck in the color yellow and raised the price by $250. Data processing system 101 then uses the bid formula (Equation 4) and the bid weights as defined in Table 4, to generate the resultant bid, $r_3$, which equals: $259,380. Data processing system 101 then ranks the three bids, with the smaller resultant bid being the most advantageous to the auction solicitor, and, therefore, the current leader.

TABLE 9

Ranking of Resultant Bids After Two Bids Have Been Submitted

| | |
| --- | --- |
| $r_3$ | $259,380 |
| $r_2$ | $259,495 |
| $r_1$ | $259,630 |

From Table 9 it can be observed that the third bid overcame the second bid, which was $135 lower that its first bid, by offering the truck in yellow and by raising the bid price by $250! In other words, some embodiments of the present invention enable a bidder to raise his price from an earlier bid while changing other bid variables and to still overcome a better bid.

Data processing system 101 then promulgates the ranking of the resultant bids.

When the bidding phase of the auction ends and the resolution phase begins, data processing system 101 publishes all of the resultant bids, the bid variables, the final ranking of the bids, and the fact that bid $b_3$ is the winning bid.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method of conducting an auction, said method comprising:
    entering, at a data processing system, a first bid into said auction in behalf of a first bidder;
    receiving, at said data processing system, a bid package from a second bidder, wherein said bid package directs said data processing system to determine a bid variable based, at least in part, on the identity of said first bidder; and
    entering, at said data processing system, a second bid into said auction in behalf of said second bidder, wherein said second bid comprises said bid variable as determined by said data processing system.

2. The method of claim 1 further comprising withholding, at said data processing system, the identity of said first bidder from said second bidder until at least after said bid package has been received at said data processing system.

3. The method of claim 1 wherein said bid package directs said data processing system to set said second bid variable to 100% of said first bid variable.

4. The method of claim 1 wherein said bid package directs said data processing system to set said second bid variable to a value that is more than 100% of said first bid variable.

5. The method of claim 1 wherein said bid package directs said data processing system to set said second bid variable to a value that is less than 100% of said first bid variable.

6. A method of conducting an auction, said method comprising:
    entering, at a data processing system, a first bid into said auction in behalf of a first bidder, wherein said first bid comprises a first bid variable;
    receiving, at said data processing system, a bid package from a second bidder, wherein said bid package directs said data processing system to determine a second bid variable based, at least in part, on the identity of said first bidder and on said first bid variable; and
    entering, at said data processing system, a second bid into said auction in behalf of said second bidder, wherein said second bid comprises said second bid variable as determined by said data processing system.

7. The method of claim 6 further comprising withholding, at said data processing system, the identity of said first bidder from said second bidder until at least after said bid package has been received at said data processing system.

8. A method of conducting an auction, said method comprising:
    entering, at a data processing system, a first bid into said auction in behalf of a first bidder, wherein said first bid comprises a first bid variable;
    entering, at said data processing system, a second bid into said auction in behalf of a second bidder, wherein said second bid comprises a second bid variable;
    receiving, at said data processing system, a bid package from a third bidder, wherein said bid package directs said data processing system to determine a third bid variable based, at least in part, on the identity of said first bidder and on the identity of said second bidder; and
    entering, at said data processing system, a third bid into said auction in behalf of said third bidder, wherein said third bid comprises said third bid variable as determined by said data processing system.

9. The method of claim 8 further comprising withholding, at said data processing system, the identity of said first bidder and the identity of said second bidder from said third bidder until at least after said bid package has been received at said data processing system from said third bidder.

10. The method of claim 8 wherein said bid package directs said data processing system to set said third bid variable to a value that is more than 100% of the maximum of said first bid variable and said second bid variable.

11. The method of claim 8 wherein said bid package directs said data processing system to set said third bid variable to a value that is more than 100% of the minimum of said first bid variable and said second bid variable.

12. The method of claim 8 wherein said bid package directs said data processing system to set said third bid variable to a value that is less than 100% of the maximum of said first bid variable and said second bid variable.

13. The method of claim 8 wherein said bid package directs said data processing system to set said third bid variable to a value that is less than 100% of the minimum of said first bid variable and said second bid variable.

14. The method of claim 8 wherein said bid package directs said data processing system to set said third bid variable to a value that is equal to the average of said first bid variable and said second bid variable.

15. A method of conducting an auction, said method comprising:
    entering, at a data processing system, a first bid into said auction in behalf of a first bidder;
    entering, at said data processing system, a second bid into said auction in behalf of a second bidder;
    receiving, at said data processing system, a bid package from a third bidder, wherein said bid package directs said data processing system to determine a third bid variable based, at least in part, on the identity of said first bidder and to ignore the identity of said second bidder in determining said third bid variable; and
    entering, at said data processing system, a third bid into said auction in behalf of said third bidder, wherein said third bid comprises said third bid variable.

16. The method of claim 15 further comprising withholding, at said data processing system, the identity of said first bidder and the identity of said second bidder from said third bidder until at least after said bid package has been received at said data processing system.

\* \* \* \* \*